United States Patent
Dent

(10) Patent No.: US 9,666,037 B2
(45) Date of Patent: *May 30, 2017

(54) PROXIMITY-BASED NOTIFICATION OF A PREVIOUSLY ABANDONED AND PRE-QUEUED ATM TRANSACTION

(71) Applicant: BANK OF AMERICA CORPORATION, Charlotte, NC (US)

(72) Inventor: Nathan Dent, Concord, NC (US)

(73) Assignee: BANK OF AMERICA CORPORATION, Charlotte, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/047,125

(22) Filed: Feb. 18, 2016

(65) Prior Publication Data

US 2016/0260295 A1 Sep. 8, 2016

Related U.S. Application Data

(63) Continuation of application No. 14/636,880, filed on Mar. 3, 2015, now Pat. No. 9,311,632.

(51) Int. Cl.
*G06Q 40/00* (2012.01)
*G07F 19/00* (2006.01)
(Continued)

(52) U.S. Cl.
CPC ..... *G07F 19/2055* (2013.01); *G06Q 20/1085* (2013.01); *G06Q 20/327* (2013.01);
(Continued)

(58) Field of Classification Search
CPC ........ G07F 19/20; G07F 19/207; G07F 17/42; G07F 19/201; G07F 19/206; G07F 19/211; G07F 7/0866; G07F 7/1008; G07F 7/1075; G07F 7/127; G06Q 20/20; G06Q 20/40; G06Q 40/02; G06Q 20/105; G06Q 20/227; G06Q 20/3278; G06Q 20/363;
(Continued)

(56) References Cited

U.S. PATENT DOCUMENTS 8,032,453 B2 10/2011 Ahuja et al.
8,145,566 B1 3/2012 Ahuja et al.
(Continued)

*Primary Examiner* — Thien M Le
(74) *Attorney, Agent, or Firm* — Michael A. Springs; Moore & Van Allen PLLC; W. Kevin Ransom

(57) ABSTRACT

Proximity-triggered notifications/alerts are communicated to bank customers as a result of a previously abandoned/canceled ATM transaction that has subsequently been pre-queued for completion. In this regard, the present invention recognizes when the customer is proximate in location to a financial institution channel suitable for completing the transaction and sends the customer an alert, which is typically received by the customer via a mobile communication device. The alert indicates that the previous abandoned ATM transaction has been pre-queued for completion and provides the customer with the location of the nearest financial institution channel suitable for completing the transaction. In specific embodiments of the invention, pre-queuing of the transaction for completion provides for the customer to complete the transaction from the last existing point in the transaction completed by the customer.

16 Claims, 4 Drawing Sheets

(51) Int. Cl.
*G06Q 20/10* (2012.01)
*G06Q 20/32* (2012.01)
*G06Q 20/40* (2012.01)

(52) U.S. Cl.
CPC ....... *G06Q 20/3224* (2013.01); *G06Q 20/401* (2013.01); *G07F 19/207* (2013.01)

(58) Field of Classification Search
CPC .............. G06Q 20/389; G06Q 20/425; G06Q 20/0655; G06Q 20/08; G06Q 20/10; G06Q 20/18; G06Q 20/206; G06Q 20/02; G06Q 20/32; G06Q 20/3223; G06Q 20/3226; G06Q 20/3276; G06Q 20/341; G06Q 20/343; G06Q 20/349; G06Q 20/352; G06Q 20/36; G06Q 20/3676; G06Q 20/385; G06Q 20/401; G06Q 20/40145; G06Q 20/4016; G06Q 20/42; G06Q 30/0251; G06Q 30/0264; G06Q 30/04; G06Q 30/06; G06Q 40/00; G06Q 40/08; G06Q 40/12; G07G 1/0045
USPC ......................................... 235/379, 380, 375
See application file for complete search history.

(56) References Cited

U.S. PATENT DOCUMENTS

| | | | |
|---|---|---|---|
| 8,260,707 B2 | 9/2012 | Treadwell et al. | |
| 8,395,500 B1 | 3/2013 | Dent | |
| 8,447,674 B2 | 5/2013 | Choudhuri et al. | |
| 8,589,278 B2 | 11/2013 | Messina et al. | |
| 8,632,000 B2 | 1/2014 | Laracey | |
| 8,860,712 B2 | 10/2014 | Lowe et al. | |
| 8,868,048 B2 | 10/2014 | Hanson et al. | |
| 9,311,632 B1* | 4/2016 | Dent | G06Q 20/1085 |
| 2002/0013950 A1* | 1/2002 | Tomsen | G06Q 10/10 725/109 |
| 2002/0016965 A1* | 2/2002 | Tomsen | G06Q 10/10 725/42 |
| 2003/0050972 A1* | 3/2003 | Felt | G06Q 30/06 709/203 |
| 2004/0068501 A1* | 4/2004 | McGoveran | G06F 11/1474 |
| 2005/0098621 A1 | 5/2005 | de Sylva | |
| 2007/0282743 A1* | 12/2007 | Lovelett | G06Q 20/10 705/40 |
| 2009/0265260 A1 | 10/2009 | Aabye et al. | |
| 2009/0265271 A1 | 10/2009 | Aabye et al. | |
| 2011/0219230 A1 | 9/2011 | Oberheide et al. | |
| 2012/0197797 A1 | 8/2012 | Grigg et al. | |
| 2012/0197798 A1 | 8/2012 | Grigg et al. | |
| 2012/0303448 A1 | 11/2012 | Psillas et al. | |
| 2013/0005253 A1 | 1/2013 | Grigg et al. | |
| 2013/0024376 A1 | 1/2013 | Choudhuri et al. | |
| 2013/0124411 A1 | 5/2013 | Kobres et al. | |
| 2013/0178233 A1 | 7/2013 | McCoy et al. | |
| 2013/0232081 A1* | 9/2013 | Antoo | G06Q 20/10 705/44 |
| 2013/0238497 A1* | 9/2013 | Ramachandran | G06Q 20/36 705/41 |
| 2014/0019352 A1* | 1/2014 | Shrivastava | G06Q 20/3674 705/41 |
| 2014/0191028 A1 | 7/2014 | Laracey | |
| 2014/0208384 A1 | 7/2014 | Youssefian et al. | |
| 2014/0250009 A1 | 9/2014 | Carlson | |
| 2016/0260068 A1* | 9/2016 | Dent | G06Q 20/1085 |
| 2016/0260295 A1* | 9/2016 | Dent | G06Q 20/1085 |

\* cited by examiner

PROXIMITY-BASED NOTIFICATION OF A PREVIOUSLY ABANDONED AND PRE-QUEUED ATM TRANSACTION

CROSS-REFERENCE OF RELATED APPLICATIONS

This application is a continuation of U.S. patent application Ser. No. 14/636,880, filed Mar. 3, 2015; the contents of which are hereby incorporated by reference.

FIELD

In general, embodiments of the invention relate to Automated Teller Machine (ATM) transactions and, more particularly, providing customers proximity-triggered notifications/alerts in response to a previously abandoned ATM transaction that has subsequently been pre-queued for completion.

BACKGROUND

In many instances financial institution customer's initiate transactions at Automated Teller Machines (ATMs) which are subsequently abandoned prior to completion. For example, a customer may initiate a deposit transaction at an ATM and subsequently realize that they have forgotten the cash or the checks that they desire to deposit or a customer may initiate a withdrawal or transfer only to realize that insufficient funds currently exist in the account from which the withdrawal/transfer was desired. In another example, the customer may initiate a lengthy/time-consuming ATM transaction, such as a product/service application, and may realize that they do not have enough time currently available to finish the transaction.

In the event that a customer cancels a transaction at an ATM they may have the need to complete the transaction at a later point-in-time (e.g., once the customer has the cash/checks in their possession for deposit or once sufficient funds exist in an account for withdrawal/transfer). However, in many instances the customer may forget to complete the transaction or will only remember to complete the transaction upon returning to an ATM or other financial institution transaction channel (e.g., banking center, mobile banking application or the like) for an unrelated transaction. In the event that the customer remembers to complete the transaction at a later point-in-time, such as when returning to an ATM, banking center or the like, the customer, in most instances, must start the transaction anew. Thus, lost transactions and/or customer inefficiencies result from customer's abandoning transactions at ATMs, which the customer has a desire to subsequently complete.

Therefore, a need exists to develop systems, apparatus, computer program products, and the like that provide for reminding the customer to complete a previously abandoned ATM transaction. The desired systems, apparatus, computer program products, and the like should provide for reminding the customer at a point-in-time when it is highly convenient for the customer to complete the transaction. Moreover, the desired systems, apparatus and computer program product should provide for the customer to pick-up the transaction where they left off (i.e., at a last point in the transaction prior to abandoning/cancelling the transaction), so as to minimize the amount of time required of the customer to complete the transaction.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like for providing financial institution customers proximity-triggered notifications/alerts in response to a previously abandoned/canceled ATM transaction that has subsequently been pre-queued for completion. In this regard, the present invention recognizes when the customer is proximate in location to a financial institution transaction channel suitable for completing the transaction (e.g., the same or another ATM, a banking center/kiosk, a point-of-sale (POS) or the like) and sends the customer an alert, which is typically received by the customer via a mobile communication device. The alert indicates that the previous abandoned ATM transaction has been pre-queued for completion and provides the customer with the location of the nearest financial institution channel suitable for completing the transaction. In specific embodiments of the invention, pre-queuing of the transaction for completion provides for the customer to complete the transaction from the last existing point in the transaction completed by the customer. For example, if the customer returns to an ATM to complete the transaction, the customer may be presented with a shortcut (i.e., a pending transaction option), which upon selection by the customer, takes the customer to the last existing point in the transaction prior to the customer cancelling the transaction (as such, the invention may eliminate the need for the customer to navigate through a series of previous-navigated menus or the like in order to move to the point in the transaction at which the customer chose to cancel the transaction).

A system for providing customers proximity-triggered notifications for resuming abandoned Automated Teller Machine (ATM) transactions defines first embodiments of the invention. The system includes a distributed computing network having disposed therein a plurality of automated teller machines (ATMs). Each ATM includes a first memory and at least one first processor in communication with the first memory. The first processor is configured to execute a usage-pattern detection routine that is configured to (1) identify a usage-pattern defined by a customer abandoning a transaction previously initiated at the ATM, and (2) in response to identifying the usage-pattern, compile data associated with the usage-pattern.

The system additionally includes an ATM authorization system that includes one or more apparatus disposed within the distributed computing network. The apparatus include a second memory, at least one second processor in communication with the second memory, and a pending transaction queuing routine that is stored in the second memory and is executable by the second processor. The pending transaction queuing routine is configured to (1) receive the data associated with the usage-pattern, (2) transform the data to create a pending transaction for the customer, and (3) queue the pending transaction in the ATM authorization system for a predetermined period of time, such that the pending transaction expires after completion of the predetermined period of time.

Additionally, the system includes a customer management system that includes one or more apparatus disposed within the distributed computing network. The apparatus include a third memory, at least one third processor in communication with the third memory, and a pending transaction customer alert that is stored in the third memory and is executable by the third processor. The pending transaction customer alert is configured to (1) receive a pending transaction notification from the ATM authorization system, (2) during the predetermined period of time, receive a location notification that indicates that the customer is proximate to a location for completing the pending transaction, and (3) in response to receiving the location notification, generate and initiate communication of a customer alert that includes information related to the pending transaction and the location for completing the pending transaction.

In specific embodiments the system further includes a mobile communication device that includes a fourth memory, at least one fourth processor in communication with the fourth memory, a location-determining mechanism in communication with the fourth processor and a mobile banking application stored in the fourth memory and executable by the fourth processor. The mobile banking application is configured to (1) receive a pending transaction notification from the customer management system, (2) implement the location-determining mechanism to determine when the customer, in possession of the mobile communication device, is proximate to the location for completing the pending transaction, and (3), based on the customer being determined to be proximate to the location for completing the pending transaction, communicate with the customer management system to determine customer configurations for communicating the customer alert. In other embodiments of the system, one or more of the plurality of ATMs is configured as a wireless beacon that scans a proximate vicinity to determine mobile communication devices associated with customers that are located within the proximate vicinity and, in such embodiments, the pending transaction notification is further configured to receive the location notification from, either directly or indirectly, the one or more of the ATMs.

In other specific embodiments of the system, the pending transaction queuing routine is further configured to transform the data to create the pending transaction, wherein the pending transaction is configured to allow the customer to resume the transaction at a last completed point in the transaction. In such embodiments the system may further include an ATM user-interface routine that is executable at the plurality of ATMs. The ATM user-interface routine is configured to provide the customer, during the predetermined time period and in immediate response to authenticating the customer, a display at an ATM of a pending transaction option. The pending transaction option is configured, in response to the customer selecting the pending transaction option, to allow the customer to resume the transaction at the last completed point in the transaction absent presentation of further selection menus.

In still further specific embodiments of the system, the usage-pattern detection routine is further configured to compile the data associated with the usage-pattern and the data includes account information of the customer, a timestamp and information related to actions completed by the customer prior to the customer abandoning the transaction.

In still further embodiments of the system, the pending transaction customer alert is further configured to determine one or more locations for completing the pending transaction based on one or more of (1) pending transaction type, and (2) pre-configured customer notifications settings.

An apparatus for providing customers proximity-triggered notifications for resuming abandoned Automated Teller Machine (ATM) transactions, defines second embodiments of the invention. The apparatus includes a computing platform having a memory and at least one processor in communication with the memory. Further, the apparatus includes a usage-pattern detection routine stored in the memory, executable by the processor and configured to (1) identify a usage-pattern at an Automated Teller Machine (ATM), wherein the usage-pattern is defined by a customer abandoning a transaction previously initiated at the ATM, and (2) in response to identifying the usage-pattern, compile data associated with the usage-pattern. The apparatus additionally includes a pending transaction queuing routine that is stored in the memory, executable by the processor, and configured to (1) receive the data associated with the usage-pattern, (2) transform the data to create a pending transaction for the customer, and (3) queue the pending transaction in the ATM authorization system for a predetermined period of time, such that the pending transaction expires after completion of the predetermined period of time. Moreover, the apparatus includes a pending transaction customer alert that is stored in the memory, executable by the processor and configured to (1) receive a pending transaction notification from the ATM authorization system, (2) during the predetermined period of time, receive a location notification that indicates that the customer is proximate to a location for completing the pending transaction, and (3) in response to receiving the location notification, generate and initiate communication of a customer alert that includes information related to the pending transaction and the location for completing the pending transaction.

In specific embodiments of the apparatus, the pending transaction customer alert is further configured to receive the location notification from a location-determining mechanism disposed within a mobile communication device associated with the customer. While in other specific embodiments of the apparatus, the pending transaction customer alert is configured to receive the location notification as a result of an ATM configured as a wireless beacon that scans a proximate vicinity to determine mobile communication devices associated with customers that are currently located within the proximate vicinity.

In still further embodiments of the apparatus, the pending transaction queuing routine is further configured to transform the data to create the pending transaction, such that the pending transaction is configured to allow the customer to resume the transaction at a last completed point in the transaction. In such embodiments the apparatus may further include an ATM user-interface routine, that is stored in the memory, executable by the processor and configured to provide the customer, during the predetermined time period and in immediate response to authenticating the customer, a display at an ATM of a pending transaction option that is configured, in response to the customer selecting the pending transaction option, to allow the customer to resume the transaction at the last completed point in the transaction absent presentation of further selection menus.

Moreover, in additional specific embodiments of the apparatus the usage-pattern detection routine is further configured to compile the data associated with the usage-pattern, such that the data includes account information of the customer, a timestamp and information related to actions completed by the customer prior to the customer abandoning the transaction.

In yet other specific embodiments of the apparatus the pending transaction customer alert is further configured to determine one or more locations for completing the pending transaction based on one or more of (1) pending transaction type, and (2) pre-configured customer notifications settings.

A computer program product including a non-transitory computer-readable medium defines third embodiments of the invention. The computer-readable medium includes a first set of codes for causing a computer to identify a usage-pattern at an Automated Teller Machine (ATM), wherein the usage-pattern is defined by a customer abandoning a transaction previously initiated at the ATM and, in response to identifying the usage-pattern, compile data associated with the usage-pattern. The computer-readable medium additionally includes a second set of codes for causing a computer to transform the data to create a pending transaction for the customer and queue the pending transaction in the ATM authorization system for a predetermined period of time, such that the pending transaction expires after completion of the predetermined period of time. In addition, the computer-readable medium includes a third set of codes for causing a computer to, during the predetermined period of time, receive a location notification that indicates that the customer is proximate to a location for completing the pending transaction and, in response to receiving the location notification, generate and initiate communication of a customer alert that includes information related to the pending transaction and the location for completing the pending transaction.

Thus, systems, apparatus, methods, and computer program products herein described in detail below provide for communicating proximity-triggered notifications/alerts to bank customers in response to a previously abandoned/canceled ATM transaction that has subsequently been pre-queued for completion. In this regard, the present invention recognizes when the customer is proximate in location to a financial institution channel suitable for completing the transaction and sends the customer an alert, which is typically received by the customer via a mobile communication device. The alert indicates that the previous abandoned ATM transaction has been pre-queued for completion and provides the customer with the location of the nearest financial institution channel suitable for completing the transaction. In specific embodiments of the invention, pre-queuing of the transaction for completion provides for the customer to complete the transaction from the last existing point in the transaction completed by the customer.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Figure 1:
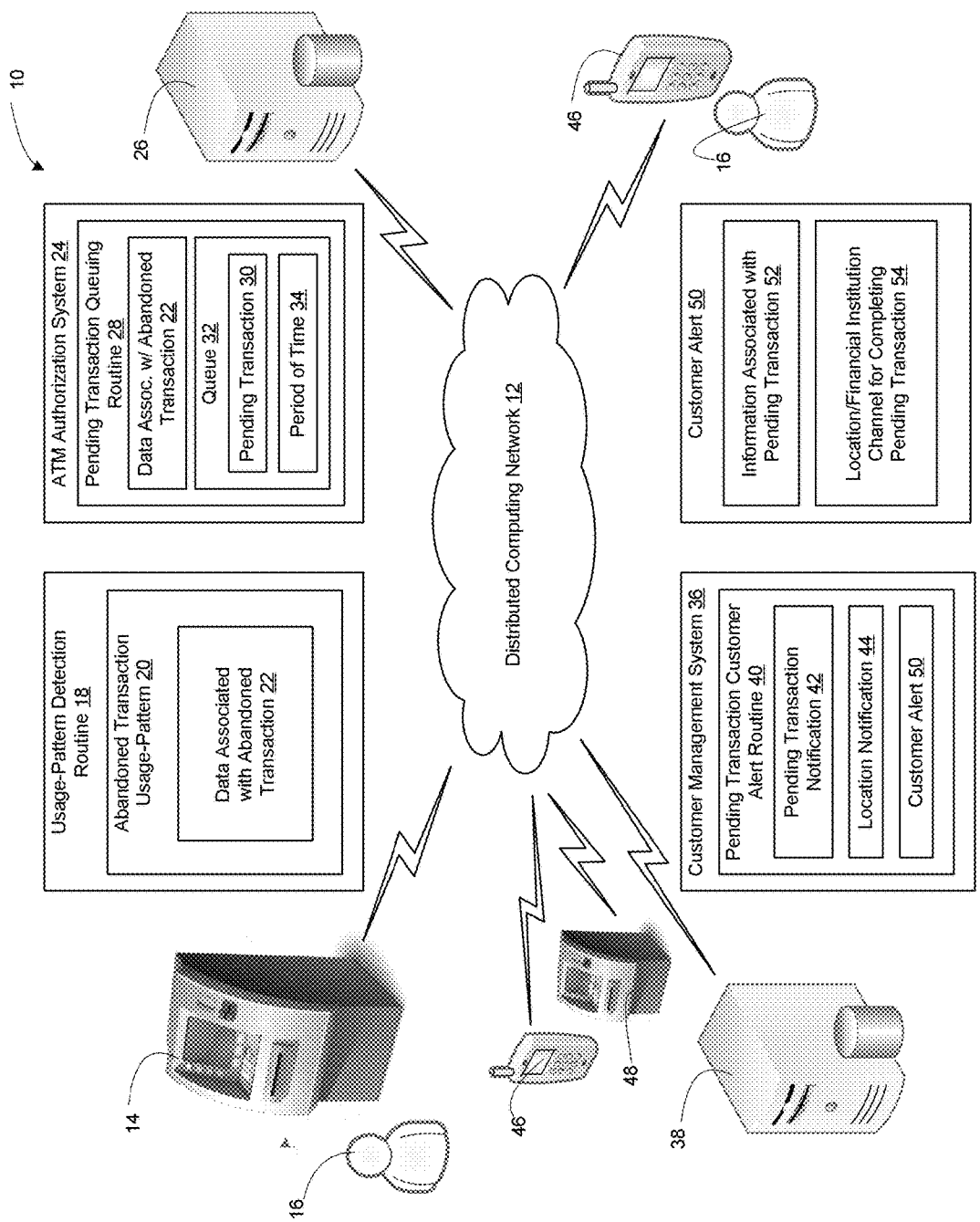
Figure 2:
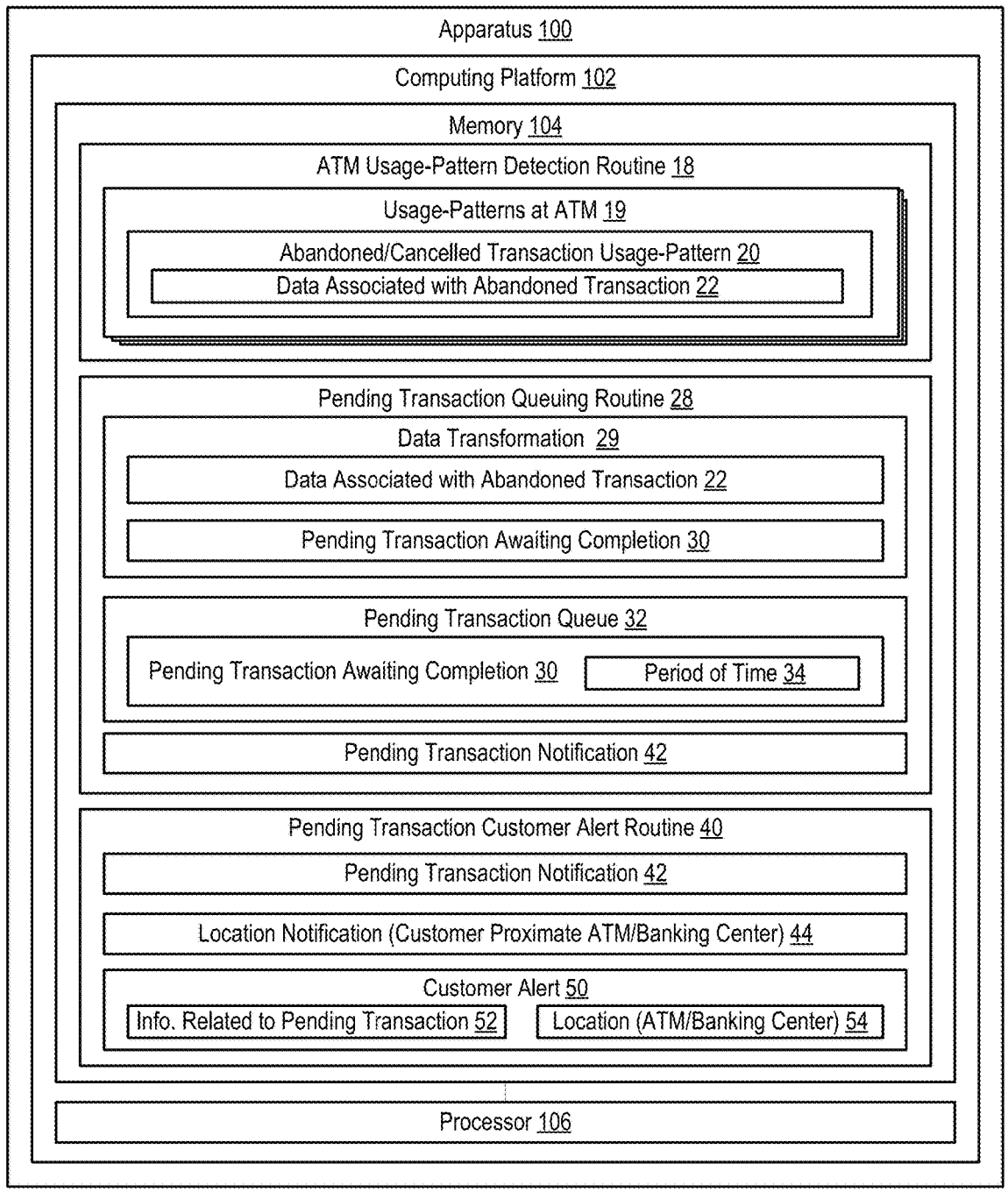
Figure 3:
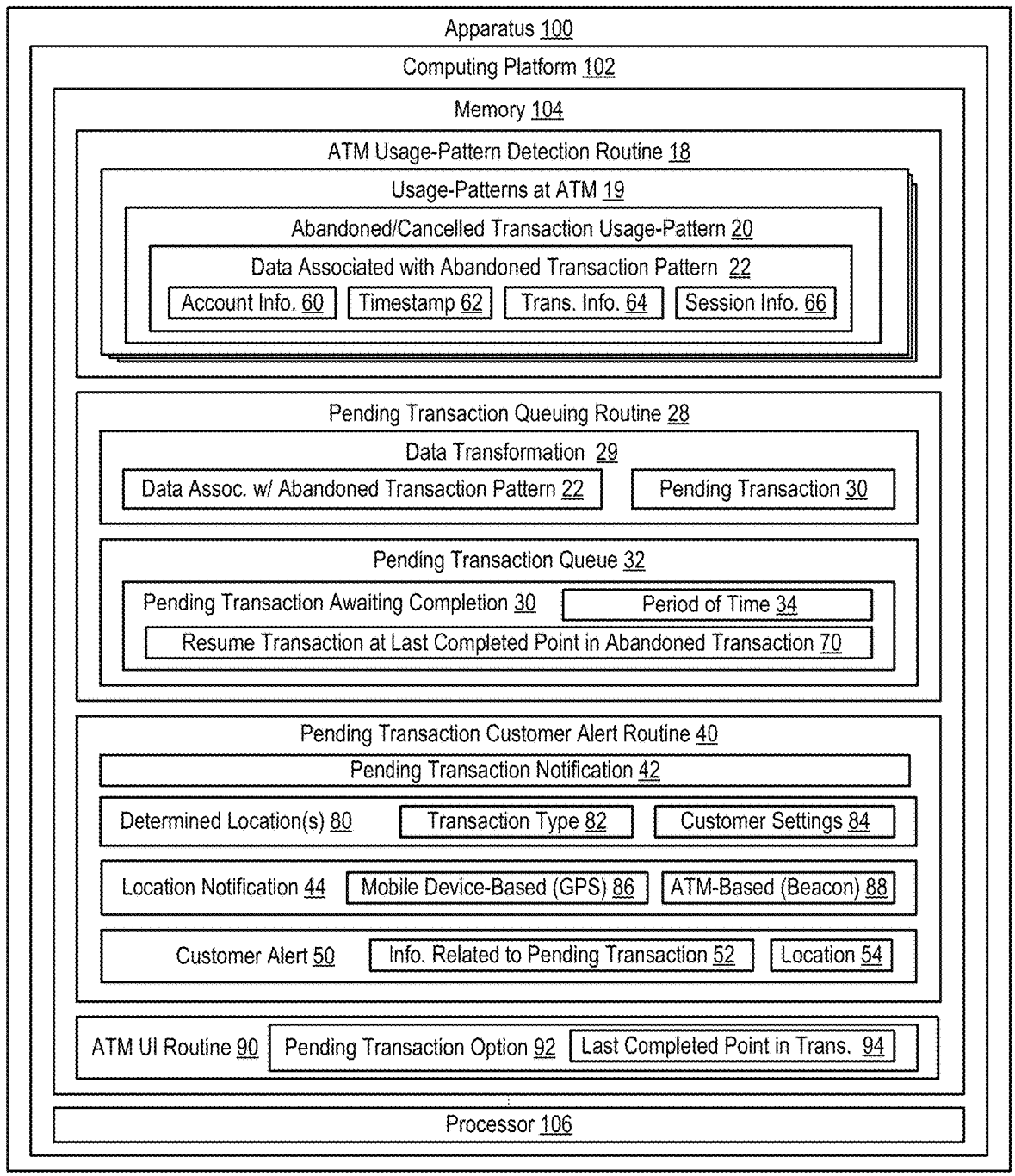
Figure 4:
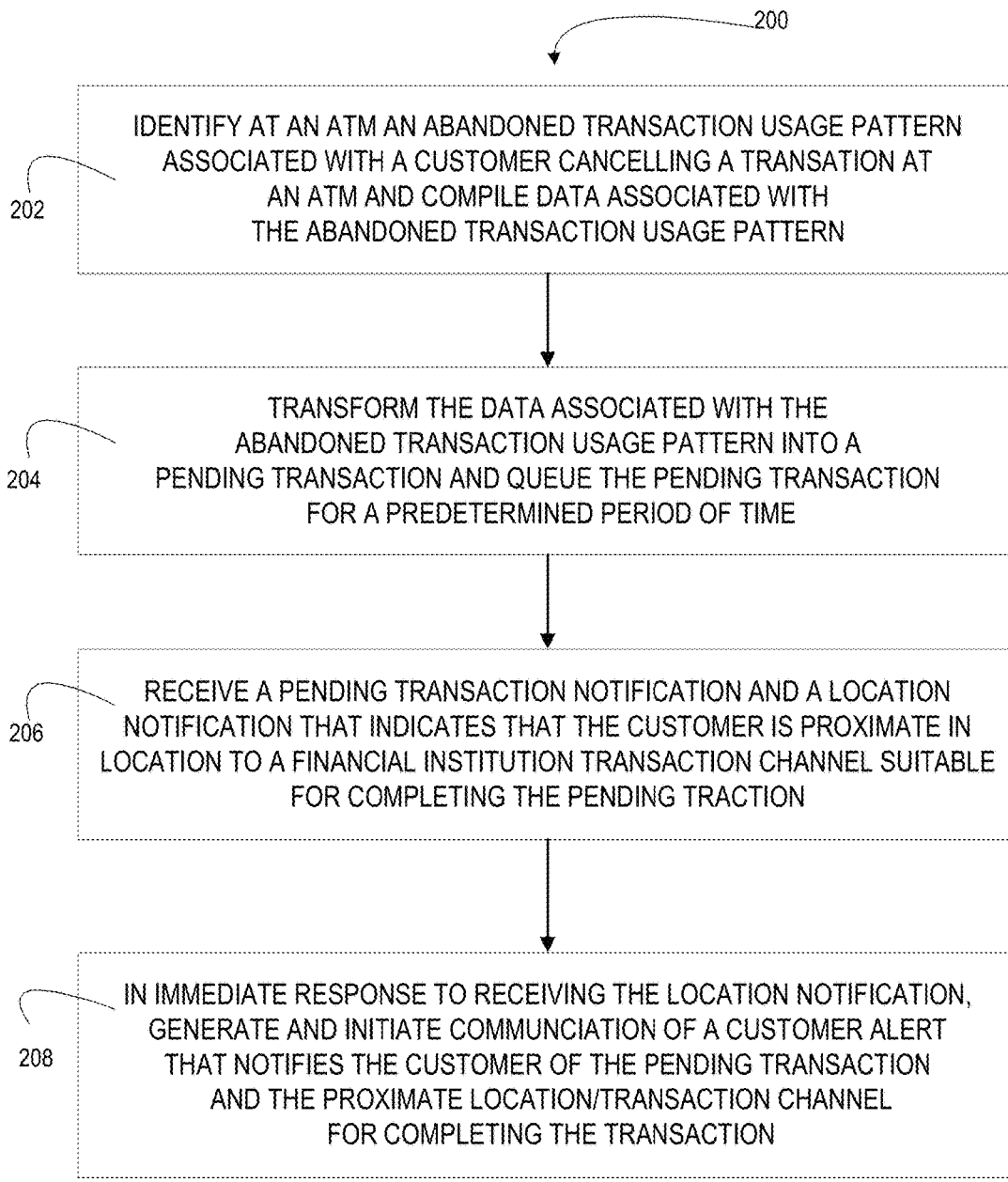

Having thus described embodiments of the invention in general terms, reference will now be made to the accompanying drawings, which are not necessarily drawn to scale, and wherein:

FIG. 1 provides a schematic diagram of a distributed computing network for providing customers proximity-triggered notifications for completing previously abandoned Automated Teller Machine (ATM) transactions, in accordance with embodiments of the present invention;

FIG. 2 provides a block diagram of the apparatus configured for providing customers proximity-triggered notifications for completing previously abandoned Automated Teller Machine (ATM) transactions;

FIG. 3 provides a more detailed block diagram of an apparatus configured for providing customers proximity-triggered notifications for completing previously abandoned Automated Teller Machine (ATM) transactions, in accordance with embodiments of the present invention; and FIG. 4 depicts a flow diagram of a method for providing customers proximity-triggered notifications for completing previously abandoned Automated Teller Machine (ATM) transactions, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for providing ATM customers with proximity-triggered notifications/alerts in response to a previously abandoned/canceled ATM transaction that has subsequently been pre-queued for completion by the customer's financial institution. In this regard, the present invention recognizes when the customer is proximate in location to a financial institution channel suitable for completing the transaction and sends the customer an alert, which is typically received by the customer via a mobile communication device. The alert indicates that the previous abandoned ATM transaction, which the customer may desire to complete, has been pre-queued for completion and provides the customer with the location of the nearest financial institution channel suitable for completing the transaction. In specific embodiments of the invention, pre-queuing of the transaction for completion provides for the customer to resume the transaction from the last existing point in the transaction completed by the customer.

Referring to FIG. 1, a schematic diagram is provided of a system 10 for providing banking customers with proximity-triggered alerts for resuming/completing previously abandoned Automated Teller Machine (ATM) transactions, in accordance with embodiments of the present invention. The system 10 includes a distributed computing network 12, which generally comprises both public (e.g., Internet) and private (e.g., intranet) communication networks and provides for both wired and wireless communication between the various components of the network. The system 10 includes a plurality of Automated Teller Machines (ATMs) 14 that are disposed within the distributed computing network 12. ATMs 14 are configured to allow customers 16 to conduct financial transactions, such as deposits, withdrawals and the like through customer interaction with various user interfaces. The ATM system is configured to execute a usage-pattern detection routine 18 that identifies various usage-patterns, including an abandon/cancelled transaction usage-pattern 20 that is defined by a customer initiating a specific transaction at the ATM (e.g., withdrawal, deposit, transfer, service/product application or the like) and, subsequently abandoning (i.e., cancelling) the transaction. The abandoned transaction usage-pattern 20 will comprise one or more predetermined actions taken by the customer during the ATM user session. In response to identifying the abandoned transaction usage-pattern 20, the usage-pattern detection routine will compile data 22 associated with the abandoned transaction, such as customer account information, a timestamp associated with when the transaction was abandoned, information associated with the abandoned transaction (e.g., a last-in-time customer event/action), information associated with the customer's ATM session (e.g., other transactions completed during the session) and the like. Once the data 22 is complied, the data 22 may be encrypted and is communicated, via a secure connection with a financial institution's ATM communication network, to an ATM authorization system 24.

As such, system 10 includes ATM authorization system 24 which is implemented on one or more apparatus, such as server 26 or the like. The ATM authorization system 24 includes a pending transaction queuing routine 28 that is configured to receive the data 22 associated with the abandoned transaction and transform the data to create a pending transaction 30. The pending transaction 30 is associated with the customer 16 that abandoned the transaction at the ATM and is defined as a partially completed transaction. Once the pending transaction 30 has been created it is stored in a pending transaction queue 32 associated with the customer for a predetermined period of time 34 (e.g., a day/24 hours, one week or the like). The pending transaction will expire (i.e., be deleted from the pending transaction queue 32 upon expiration of the predetermined period of time 34). In specific embodiments of the invention the predetermined period of time 34 will be determined based on, at least one of, the type of the pending transaction (i.e., previously abandoned transaction) and/or customer and/or financial institution configuration that define how long a pending transaction should remain in a pending transaction queue.

System 10 additionally, includes customer management system 36 which is implemented on one or more apparatus, such as server 38 or the like. Customer management system 36 comprises individual customer profiles (not shown in FIG. 1) that define, based on customer and financial institution configuration, how the customer is managed by the financial institution (e.g., what actions/events may trigger notifications/alerts from the financial institution to the customer and the like). Customer management system 36 includes pending transaction customer alert routine 40 that is configured to receive a pending transaction notification 42 from the ATM authorization system 24. The pending transaction notification 42 includes information about a pending transaction including the associated customer 16, the period of time 34 for which the transaction will be pending 34 (i.e., the expiration time period) and the like. In response to receiving the pending transaction notification 42 and while the pending transaction is still active (i.e., prior to expiration of the predetermined time period), the pending transaction customer alert routine 40 tracks the location of the customer, such that, when the customer is determined to be proximate to a location where the customer can complete the pending transaction (e.g., an ATM, a banking center, a kiosk, or the like) the pending transaction customer alert routine 40 receives a location notification 44. The location notification indicates the location of the proximate ATM, banking center or the like at which the customer may complete the pending transaction 30. The distance defined as "proximate" may be configured by the financial institution and/or by the customer. In specific embodiments, the customer configurations will override any financial institution, such that, the distance to a location that triggers a location notification is customer defined.

In specific embodiments of the invention, the location notification 44 is initiated by a mobile communication device 46 in possession of a customer that is equipped with a location-determining mechanism, such as Global Positioning System (GPS) location determining mechanisms or the like. An application executing on the mobile communication device 46 (e.g., mobile banking application) or executing remotely may be configured to determine proximity to an ATM or a banking center based on the current location of the mobile communication device and known locations of ATMs, banking centers and the like. In other specific embodiments of the invention, the location notification 44 is initiated by ATMs 48 that are specifically configured as wireless communication beacons that to scan the proximate vicinity of the ATM 48 (e.g., communicate beacon signals) to determine which devices are currently active within proximate vicinity of the ATM.

In response to receiving the location notification 44, the pending transaction customer alert routine 40 will generate, and initiate network communication of, a customer alert 50 that includes information 52 related to the pending transaction and the location(s) 54 for completing the pending transaction (i.e., the ATM(s) or banking centers in the proximate vicinity of the customer). In specific embodiments, receipt of either the pending transaction notification 42 or the location notification 44 will prompt the customer alert routine 40 to access a customer profile (not shown in FIG. 1) that stores customer configurations related to pending transaction customer alerts. The configurations may include which type of abandoned applications trigger notifications, the communication channel preferred for sending the customer alerts, the preferred times and frequency for sending the customer alerts, the proximate distance to a location that triggers an alert, the type of transaction channel locations (e.g., ATMs only) that trigger an alert and the like. In this regard, the customer's profile may be accessed to determine if a customer alert is required for this particular pending transactions and/or this particular location for completing the pending transaction.

In specific embodiments of the invention the customer alert 46 is a mobile communication alert that is displayed on the customer's mobile communication device. The information 52 related to the pending transaction may include the time, place and specifics of the abandoned transaction and the location for completing the pending may include network access (embedded link) to a map with directions to the location (i.e., directions to an ATM, banking center, kiosk or the like).

Referring to FIG. 2, a block diagram is presented of an apparatus 100, which is configured for providing customers proximity-triggered alerts for resuming previously abandoned ATM transactions, in accordance with embodiments of the present invention. The apparatus 100, which may comprise more than one device, includes a computing platform 102 having a memory 104 and at least one processor 106 in communication with the memory 104. The memory 104 of apparatus 100 stores usage-pattern detection routine that is executable by the processor 106 and configured to identify usage-patterns 19 including an abandoned/cancelled transaction pattern 20. The abandoned/cancelled transaction pattern 20 is defined by a series of events (i.e., user inputs) at the ATM which indicate the customer's desire to initiate a specific transaction (e.g., withdrawal, deposit, transfer, service/product application or the like) absent the necessary events (i.e., user inputs) to complete the transaction. In response to identifying the abandoning transaction usage-pattern 20, the usage-pattern detection routine 18 is further configured to compile data associated with abandoned transaction 22, such as customer account information/customer identifier data, a timestamp for the abandoned transaction, information related to the abandoned transaction and information related to the customer's ATM session.

Additionally, memory 104 of apparatus 100 includes pending transaction queuing routine 28 that is executable by processor 106 and configured to receive the data 22 associated with abandoned transaction and perform a data transformation 29 to create a pending transaction 30 that is awaiting completion by the customer. As previously noted a pending transaction 30 is a partially completed ATM transaction that has outstanding actions to be taken by the customer to complete the transaction. Once the pending transaction 30 has been created, the pending transaction 30 is placed in the pending transaction queue 32 for the predetermined period of time 43, such that the pending transaction 30 will expire (i.e., be deleted from the queue) upon completion of the period of time 34. While in the queue, the pending transaction 30 may be presented to the customer, for completion, when the customer interacts with a financial institution transaction channel, such as an ATM, a banking center, a kiosk, or where applicable, an online or mobile banking application. In addition, pending transaction queuing routine 28 is configured to generate and initiate communication of a pending transaction notification, which is communicated to a customer management system for subsequent generation and communication of proximity-triggered alerts that notify the customer of the pending pre-queued transaction that awaits the customer's completion at a proximate financial institution transaction channel (ATM, banking channel or kiosk).

As such, the memory 104 of apparatus 100 additionally includes pending transaction customer alert routine 40 that is executable by processor 106 and configured to receive the pending transaction notification 42 and, during the predetermined period time 34, receive a location notification that indicates that the customer is proximate (within a predetermined distance) to a location suitable for completing the transaction (i.e., an ATM affiliated with the financial institution, a financial institution banking center, a banking kiosk or the like). As previously noted, the location information in the location notification 44 may be mobile communication-based (i.e., location determining mechanism/GPS within the mobile device) or ATM/banking center-based (i.e., beacon signals emanating from an ATM or banking center). In response to receiving the location notification 44 and, in some instances verifying alert configuration requirements of the customer, the pending transaction customer alert routine 40 will generate, and initiate communication of, a customer alert 50 that includes information 52 related to the pending transaction and the location 54 for completing the pending transaction.

Referring to FIG. 3 a block diagram is presented of an apparatus 100, which is configured for providing financial institution customers' proximity-triggered alerts that notify the customer that a previously abandoned ATM transaction may be completed at a proximate financial institution transaction channel (ATM, banking center or the like), in accordance with embodiments of the present invention. In addition to providing greater detail, FIG. 3 highlights various alternate embodiments of the invention. The apparatus 100 may include one or more of any type of computing device, such as multiple servers or the like. The present apparatus and methods can accordingly be performed on any form of one or more computing devices.

The apparatus 100 includes computing platform 102 that can receive and execute algorithms, such as routines, and applications. Computing platform 102 includes memory 104, which may comprise volatile and non-volatile memory, such as read-only and/or random-access memory (RAM and ROM), EPROM, EEPROM, flash cards, or any memory common to computer platforms. Further, memory 104 may include one or more flash memory cells, or may be any secondary or tertiary storage device, such as magnetic media, optical media, tape, or soft or hard disk. Moreover, memory 104 may comprise cloud storage, such as provided by a cloud storage service and/or a cloud connection service.

Further, computing platform 102 also includes processor 106, which may be an application-specific integrated circuit ("ASIC"), or other chipset, processor, logic circuit, or other data processing device. Processor 106 or other processor such as ASIC may execute an application programming interface ("API") (not shown in FIG. 3) that interfaces with any resident programs, such as usage-pattern detection routine 18, pending transaction queuing routine 28, pending transaction customer alert routine 40, ATM user-interface routine 90 and sub-modules associated therewith or the like stored in the memory 104 of the apparatus 100.

Processor 106 includes various processing subsystems (not shown in FIG. 3) embodied in hardware, firmware, software, and combinations thereof, that enable the functionality of apparatus 100 and the operability of the apparatus on a network. For example, processing subsystems allow for initiating and maintaining communications and exchanging data with other networked devices. For the disclosed aspects, processing subsystems of processor 106 may include any subsystem used in conjunction with usage-pattern detection routine 18, pending transaction queuing routine 28, pending transaction customer alert routine 40, ATM user-interface routine 90 and related algorithms, sub-algorithms, modules, sub-modules thereof.

Computer platform 102 may additionally include communications module (not shown in FIG. 3) embodied in hardware, firmware, software, and combinations thereof, that enables communications among the various components of the apparatus 100, as well as between the other networked devices. Thus, communication module may include the requisite hardware, firmware, software and/or combinations thereof for establishing and maintaining a network communication connection.

The memory 104 of apparatus 100 stores usage-pattern detection routine that is executable by the processor 106 and configured to identify usage-patterns 19 including an abandoned/cancelled transaction pattern 20. The abandoned/cancelled transaction pattern 20 is defined by a series of events (i.e., user inputs) at the ATM which indicate the customer's desire to initiate a specific transaction absent the necessary events (i.e., user inputs) to complete the transaction. In response to identifying the abandoning transaction usage-pattern 20, the usage-pattern detection routine 18 is further configured to compile data associated with abandoned transaction 22, such as customer account information 60, including customer identifier data, a timestamp 62 for the abandoned transaction, information 64 related to the abandoned transaction and information 66 related to the customer's ATM session (e.g., other transactions conducted by the customer during the ATM interaction session). Information 64 related to the transaction and information 66 related to the ATM session may be instrumental in those embodiments of the invention in which the pending transaction 30 is queued so as to provide for the customer to resume the transaction at a point at which they abandoned the transaction (i.e., the customer can conveniently forego performing the steps/user inputs which they conducted leading up to the abandonment of the transaction).

Additionally, as previously described, the memory 104 of apparatus 100 includes pending transaction queuing routine 28 that is executable by processor 106 and configured to receive the data 22 associated with abandoned transaction and perform a data transformation 29 to create a pending transaction 30 that is awaiting completion by the customer. As previously noted a pending transaction 30 is a partially completed ATM transaction that has outstanding actions to be taken by the customer to complete the transaction. In addition, according to specific embodiments of the invention the pending transaction queuing routine 28 is able to create the pending transaction such that the customer can resume the transaction at a last completed point in the abandoned transaction 70. It should be noted that such configuration of the pending transaction accounts for the fact that while the customer initiated the transaction at an ATM, the customer may complete the transaction at a different transaction channel (e.g., a banking center, a mobile/online banking application or the like). As such the pending transaction that is created is configured to allow for the customer to resume the transaction at a last completed point in the transaction regardless of the transaction channel chosen by the customer to complete the transaction. In this regard, if the customer chooses to complete the transaction at the same or another ATM the customer may conveniently avoid various menus and input actions that were presented and/or performed by the customer prior to the transaction and if the customer chooses to complete the banking center various inquires surrounding the transaction may be avoided by the banking center representative since this data will already exist in the pending transaction file.

As previously discussed, once the pending transaction 30 has been created, the pending transaction 30 is placed in the pending transaction queue 32 for the predetermined period of time 43, such that the pending transaction 30 will expire (i.e., be deleted from the queue) upon culmination of the period of time 34. While in the queue, the pending transaction 30 may be presented to the customer, for completion, when the customer interacts with any financial institution transaction channel, such as an ATM, a banking center, a kiosk, or where applicable, an online or mobile banking application. It should be noted that, according to specific embodiments, such presentation of the pending transaction 30 to the customer at the various transaction channels will occur regardless of the communication of the customer alert 50. In addition, pending transaction queuing routine 28 is configured to generate and initiate communication of a pending transaction notification, which is communicated to a customer management system for subsequent generation and communication of proximity-triggered alerts that notify the customer of the pending pre-queued transaction that awaits the customer's completion at a proximate financial institution transaction channel (ATM, banking channel or kiosk).

Moreover, the memory 104 of apparatus 100 includes pending transaction customer alert routine 40 that is executable by processor 106 and configured to receive the pending transaction notification 42 and, during the predetermined period time 34, receive a location notification that indicates that the customer is proximate (within a predetermined distance) to a location suitable for completing the transaction (i.e., an ATM affiliated with the financial institution, a financial institution banking center, a banking kiosk or the like). As previously noted, the location information in the location notification 44 may be mobile communication-based (i.e., location determining mechanism/GPS within the mobile device) or ATM/banking center-based (i.e., beacon signals emanating from an ATM or banking center).

In specific embodiments of the invention, the customer alert routine 40 or some other complementary routine or logic is configured to determine locations 80 for completing the transaction based on one or more of the type of pending transaction 82 (i.e., a withdrawal, a deposit, a transfer or the like) and/or predetermined customer settings/configuration 84. The type of pending transaction 82 takes into the account the fact that certain types of transactions can only occur at certain transactions channels. Moreover, the customer settings may, for example, indicate that the customer only desires to be alerted when proximate in location to ATMs and not notified if proximate to a banking center. Such determination may occur prior to receiving location notifications 44 or may occur prior to receiving location notifications 44, thus; qualifying the type of location notifications 44 received.

In response to receiving the location notification 44 and, in some instances verifying alert configuration requirements of the customer, the pending transaction customer alert routine 40 will generate, and initiate communication of, a customer alert 50 that includes information 52 related to the pending transaction and the location 54 for completing the pending transaction.

In specific embodiments of the invention, the memory 104 of apparatus 100 may additionally include ATM user-interface routine 90 that is configured to, in response to queuing a pending transaction, present a pending transaction option 92 to the customer at the onset of the ATM session (i.e., immediately after the customer has performed requisite authentication/inputted login PIN or the like). The pending transaction option 92 not only notifies the customer that a pending transaction exists but also is configured as a shortcut to the pending customer. In this regard, the pending transaction option 92 is configured as a selectable entry key that upon activation/selection by the customer takes the customer (i.e., moves the onscreen presentation) to a last completed point in the transaction 94 so that the customer may resume the transaction at the point at which they left off (i.e., the point of abandonment). As such, selection of the pending transaction option 92 by the customer eliminates the need for the customer to provide previous information and/or be presented intermediary input dialog displays/menus which were previously presented to and responded to by the customer.

Referring to FIG. 4, a flow diagram 200 is presented of a method for providing customers proximity-triggered alerts for notifying the customer of an option to resume a previously abandoned ATM transaction at a currently conveniently located transaction channel, in accordance with embodiments of the present invention. At Event 202, an abandoned transaction usage-pattern is identified at an Automated Teller Machine (ATM). The abandoned transaction usage-pattern is identified based on the user providing a series of inputs at the ATM that indicate that the user initiated a transaction, such as a deposit, withdrawal, transfer, service/product application or the like, at the ATM and subsequently chose to cancel or abandon the transaction. Once the abandoned transaction has been identified, data associated with the abandoned transaction usage-pattern is compiled. The data may include account/customer identifying information, a timestamp (date/time) of the abandoned transaction, information associated with the transaction (actions taken by the customer), information associated with the ATM session (other transactions conducted) and the like.

At Event 204, the data associated with the abandoned transaction is transformed to create a pending transaction, otherwise referred to as a partially completed transaction, and the pending transaction is stored in a pending transaction queue for predetermined period of time. The pending transaction queue provides for the pending transaction to be presented or otherwise accessible to the customer for completion during the predetermined time period, such that, upon expiration of the period of time (e.g., a day, a week or the like) the pending transaction is deleted form the queue and is no longer presented to or accessible to the customer. The predetermined period of time may be defined may the financial institution, the customer and/or based on the type of transaction.

At Event 204, in response to creating the pending transaction, a location notification is received that indicates that the customer is proximate in location to a financial institution transaction channel (e.g., ATM, banking center, kiosk or the like) suitable for completing the pending transaction. In specific embodiments of the invention, the location notification is triggered by a mobile communication device in possession of the customer that includes a location determining mechanism (e.g., GPS). The mobile communication may be configured to execute a mobile banking application and the customer may have opted-in regarding sharing location information with the financial institution. In other embodiments of the invention, the location notification may be triggered by an ATM or other device at a banking center serving as a communication beacon that scans the proximate vicinity to determine accessible mobile communication devices currently located in the proximate vicinity.

At Event 208, in immediate response to receiving the location notification, a customer alert is generated and communicated to the customer. The customer alert notifies the customer of the existence of the pending transaction (i.e., notifies the customer that the financial institution is aware that the customer initiated but failed to complete at a transaction at an ATM) and provides details (address, access to a map) as to the transaction channel (e.g., ATM, banking center or the like) that the customer is currently in the vicinity of, which is suitable for using to complete the pending transaction.

Thus, systems, apparatus, methods, and computer program products described above provide for communicating proximity-triggered notifications/alerts to bank customers as a result of a previously abandoned/canceled ATM transaction by the customer that has subsequently been pre-queued for completion by the financial institution. In this regard, the present invention recognizes when the customer is proximate in location to a financial institution channel suitable for completing the transaction and sends the customer an alert, which is typically received by the customer via a mobile communication device. The alert indicates that the previous abandoned ATM transaction, which the customer may desire to complete, has been pre-queued for completion and provides the customer with the location of the nearest financial institution channel suitable for completing the transaction. In specific embodiments of the invention, pre-queuing of the transaction for completion provides for the customer to complete the transaction from the last existing point in the transaction completed by the customer.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A computer program product comprising:
   a non-transitory computer-readable medium comprising:
   a first set of codes for causing a computer to identify a usage-pattern at an Automated Teller Machine (ATM), wherein the usage-pattern is defined by a customer prior to failure of a transaction previously initiated at the ATM and in response to identifying the usage-pattern, compile data associated with the usage-pattern, wherein the data includes (i) account information of the customer, (ii) a timestamp and (iii) information related to actions completed by the customer prior to failure of the transaction;
   a second set of codes for causing a computer to transform the data, including the information related to actions completed by the customer prior to the failure of the transaction, to create a pending transaction for the customer and queue the pending transaction in the ATM authorization system for a predetermined period of time, wherein the pending transaction expires after completion of the predetermined period of time and the start of the predetermined period of time is based on the timestamp of failed transaction; and
   a third set of codes for causing a computer to, during the predetermined period of time, receive a location notification that indicates that the customer is proximate to a location for completing the pending transaction and, in response to receiving the location notification, generate and initiate communication of a customer alert that includes information related to the pending transaction and the location for completing the pending transaction.

2. The computer program product of claim 1, wherein the third set of codes is further configured to cause the computer to receive the location notification from a location-determining mechanism disposed within a mobile communication device associated with the customer.

3. The computer program product of claim 1, wherein the second set of codes is further configured to cause the computer to transform the data to create the pending transaction that is configured to allow the customer to resume the transaction at a last completed point in the transaction.

4. The computer program product of claim 3, further comprising a fourth set of codes for causing a computer to provide the customer, during the predetermined time period and in immediate response to authenticating the customer, a display at an ATM of a pending transaction option that is configured, in response to the customer selecting the pending transaction option, to allow the customer to resume the transaction at the last completed point in the transaction absent presentation of further selection menus.

5. The computer program product of claim 1, wherein the third set of codes is further configured to cause the computer to receive the location notification as a result of an ATM configured as a wireless beacon that scans a proximate vicinity to determine mobile communication devices associated with customers that are currently located within the proximate vicinity.

6. A computer program product comprising:
   a non-transitory computer-readable medium comprising:
   a first set of codes for causing a computer to identify a usage-pattern at an Automated Teller Machine (ATM), wherein the usage-pattern is defined by a customer prior to failure of a transaction previously initiated at the ATM and in response to identifying the usage-pattern, compile data associated with the usage-pattern, wherein the data includes (i) account information of the customer, (ii) a timestamp and (iii) information related to actions completed by the customer prior to failure of the transaction;
   a second set of codes for causing a computer to transform the data, including the information related to actions completed by the customer prior to the failure of the transaction, to create a pending transaction for the customer and queue the pending transaction in the ATM authorization system for a predetermined period of time, wherein the pending transaction expires after completion of the predetermined period of time and the start of the predetermined period of time is based on the timestamp of failed transaction; and
   a third set of codes for causing a computer to, determine one or more locations for completing the pending transaction based on one or more of (1) pending transaction type, and (2) pre-configured customer notifications settings and during the predetermined period of time, receive a location notification that indicates that the customer is proximate to a location for completing the pending transaction and, in response to receiving the location notification, generate and initiate communication of a customer alert that includes information related to the pending transaction and the location for completing the pending transaction.

7. The computer program product of claim 6, wherein the third set of codes is further configured to cause the computer to receive the location notification from a location-determining mechanism disposed within a mobile communication device associated with the customer.

8. The computer program product of claim 6, wherein the second set of codes is further configured to cause the computer to transform the data to create the pending transaction that is configured to allow the customer to resume the transaction at a last completed point in the transaction.

9. The computer program product of claim 8, further comprising a fourth set of codes for causing a computer to provide the customer, during the predetermined time period and in immediate response to authenticating the customer, a display at an ATM of a pending transaction option that is configured, in response to the customer selecting the pending transaction option, to allow the customer to resume the transaction at the last completed point in the transaction absent presentation of further selection menus.

10. The computer program product of claim 6, wherein the third set of codes is further configured to cause the computer to receive the location notification as a result of an ATM configured as a wireless beacon that scans a proximate vicinity to determine mobile communication devices associated with customers that are currently located within the proximate vicinity.

11. A method for providing customers proximity-triggered notifications for resuming failed Automated Teller Machine (ATM) transactions, the method comprising:

identifying a usage-pattern at an Automated Teller Machine (ATM), wherein the usage-pattern is defined by a customer prior to failure of a transaction previously initiated at the ATM and in response to identifying the usage-pattern, compile data associated with the usage-pattern, wherein the data includes (i) account information of the customer, (ii) a timestamp and (iii) information related to actions completed by the customer prior to failure of the transaction;

transforming the data, including the information related to actions completed by the customer prior to the failure of the transaction, to create a pending transaction for the customer and queue the pending transaction in the ATM authorization system for a predetermined period of time, wherein the pending transaction expires after completion of the predetermined period of time and the start of the predetermined period of time is based on the timestamp of failed transaction;

during the predetermined period of time, receiving a location notification that indicates that the customer is proximate to a location for completing the pending transaction; and in response to receiving the location notification, initiating communication of a customer alert that includes information related to the pending transaction and the location for completing the pending transaction.

12. The method of claim 11 further comprising receiving the location notification from a location-determining mechanism disposed within a mobile communication device associated with the customer.

13. The method of claim 11 further comprising transforming the data to create the pending transaction that is configured to allow the customer to resume the transaction at a last completed point in the transaction.

14. The method of claim 13 further comprising providing the customer, during the predetermined time period and in immediate response to authenticating the customer, a display at an ATM of a pending transaction option that is configured, in response to the customer selecting the pending transaction option, allowing the customer to resume the transaction at the last completed point in the transaction absent presentation of further selection menus.

15. The method of claim 11 further comprising receiving the location notification as a result of an ATM configured as a wireless beacon that scans a proximate vicinity to determine mobile communication devices associated with customers that are currently located within the proximate vicinity.

16. The method of claim 11 further comprising determining one or more locations for completing the pending transaction based on one or more of (1) pending transaction type, and (2) pre-configured customer notifications settings.

\* \* \* \* \*